Aug. 2, 1949.  J. F. KÖHNKE  2,477,696
PIPE CONNECTION CLIP
Filed Nov. 30, 1946   3 Sheets-Sheet 1

Aug. 2, 1949.  J. F. KÖHNKE  2,477,696
PIPE CONNECTION CLIP

Filed Nov. 30, 1946  3 Sheets-Sheet 2

Aug. 2, 1949.   J. F. KÖHNKE   2,477,696
PIPE CONNECTION CLIP

Filed Nov. 30, 1946   3 Sheets-Sheet 3

Patented Aug. 2, 1949

2,477,696

UNITED STATES PATENT OFFICE 2,477,696

PIPE CONNECTION CLIP

Johan Friedrich Köhnke, Haarlem, Netherlands

Application November 30, 1946, Serial No. 713,361
In the Netherlands January 18, 1943

Section 1, Public Law 690, August 8, 1946
Patent expires January 18, 1963

2 Claims. (Cl. 287—54)

This invention relates to pipe connection clips or clamps in which the connection is effected by clamping a clip-piece on to a pipe. A main object of the invention is to provide an improved structure simple and cheap in construction and in use but by which an extremely solid connection is obtained.

Another important object is to provide a clip clamping and supporting the pipe in its pipe-rest in such a way that the clamping force exerted by the clamping strap causes a very slight deformation of the pipe by which an almost unsurmountable obstacle is offered to the pipe moving out of its place in the clip-piece.

Another object is to obtain a clamping force by driving a wedge into wedgeholes in a direction parallel to the clamped pipe, so that the wedge does not form an inconvenient projection.

A further object, more specifically, is to provide a pipe-rest by two edges on to which the pipe is clamped by a clamping force exerted by a clamping strap on the pipe along a semi-circular line between the two edges.

A still further object is to utilize the walls provided with supporting edges for the pipe and interconnecting walls in a simple way to fasten the clamping strap, the tightening-means thereof.

A still further object is to utilize the same above-mentioned walls for clamping two pipes at right angles to each other.

Other objects and the means by which these and the abovementioned objects are obtained will follow from the following description at hand of the accompanying drawing, which show, by way of example, several types of pipe-connection-clips according to the invention.

Figure 2:
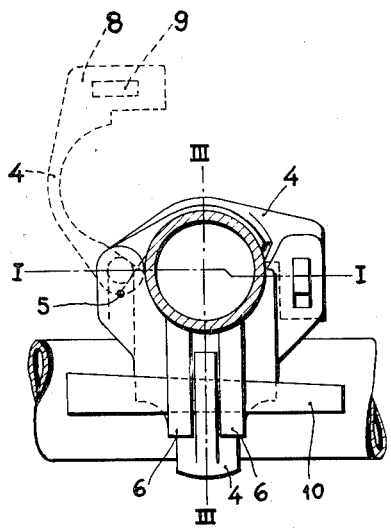
Figure 2 is a side-view in which the clamping ring is shown in its opened position in dotted lines.

The clip piece has two semi-cylindrical rests for the pipes to be connected, which rests cross each other at right angles and are formed by semi-cylindrical cut-out walls 1, which are at right angles to the axis of the pipe to be clamped.

Two groove-shaped bearings 2 are secured to the lengthening-piece of one of the walls, in which bearings taps 3 of a semi-cylindrical clamping strap 4 can rotate with some play. The movement of taps 3 towards the open side of the groove-shaped bearings is limited by locking pins 5, provided at this side. The clamp is provided with two ears 6 diametrically opposed to the bearings of the taps, which ears have wedge-holes 7. The clamping strap 4 has on its other end an ear 8 with wedge-hole 9, which fits with some play between the ears 6. By driving in a wedge 10, the pipe can be rigidly enclosed between the two semi-cylindrical parts of the clip-piece and the clamping ring. The distance between the ears 6 being small, the wedge 10 can be driven in with great force, without running the risk of considerable deformation, like e. g. a cat's back. The distance between the walls 1 of each semi-cylindrical rest of the clip-piece being rather great, the pipe rigidly clamped therein is slightly deformed, so that a very solid connection is obtained. Moreover, the thin projecting end of the wedge 10 being slightly bent, the clamp connection is prevented from getting loose.

Figure 3:
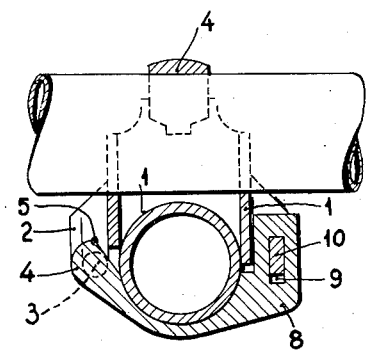
Figure 3 shows a section along the line III—III of Figure 2.
Figure 1:
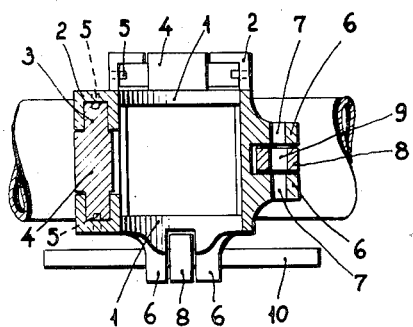
Figure 1 shows a section of a clip-piece along the line I—I of Figure 2 for connecting two pipes crossing each other at right angles, the upper pipe not being shown.
Figure 4:
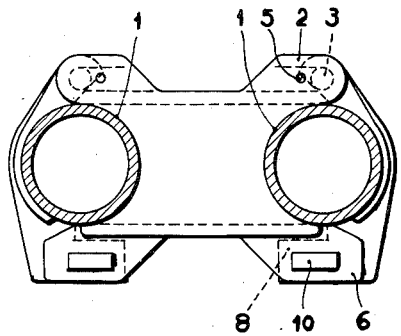
Figure 5:
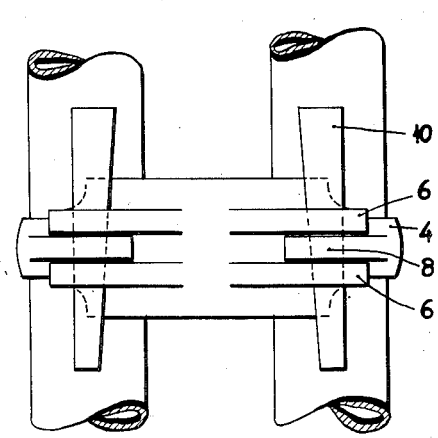

Figures 4 and 5 show on a reduced scale a top view and a side view respectively of a clip-piece for connecting two parallel pipes. Here as well as in the following figures, the various parts are designated by the same reference numbers as in Figures 1, 2 and 3.

Figure 6:
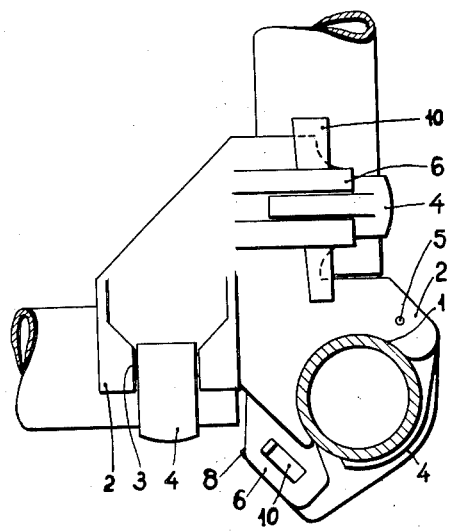
Figure 7:
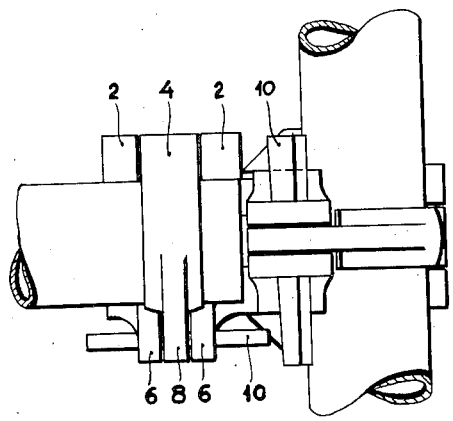

Figures 6 and 7 show a top view and a side view respectively of a clip-piece for connecting two pipes, placed at right angles, with a third pipe, which is at right angles to the plane in which the first two pipes lie.

Figure 9:
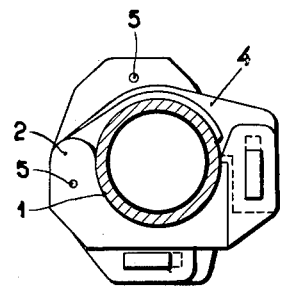
Figure 8:
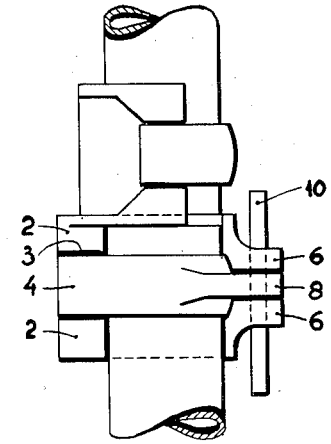

Figures 8 and 9 show a front view and a side view respectively of a clip-piece for connecting two pipes which are in alignment with each other.

Figure 10:
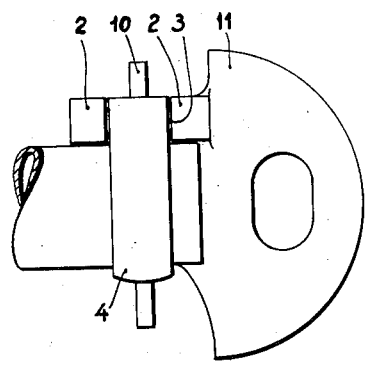
Figure 11:
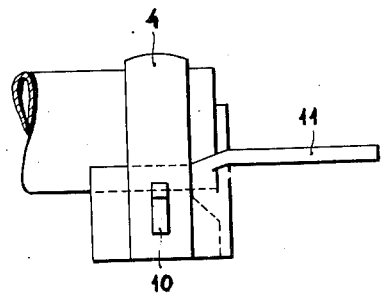

Figures 10 and 11 show a top view and a side view respectively of a clip-piece by means of which a pipe can be fitted in a wall. To this end, the clip-piece is provided with a semi-circular bearing plate 11, by means of which the clip-piece can be fitted in a joint cut out in the wall.

It is to be understood that the invention is not limited to the above examples.

I claim:

1. A pipe-connection-clip comprising a pipe-rest, a semi-cylindrical clamping strap hinged to one side thereof, tightening means for the free end of the clamping strap secured to the other side of said rest whereby a pipe can be clamped between the said rest and strap, said rest having two walls the apexes of which are semi-cylindrical at right angles to the axis of the pipe to be clipped thereto and spaced apart from each other a distance greater than the breadth of the clamping strap where same overlies the pipe, said strap being spaced at substantially equal distances from said walls whereby said pipe is pinched between the upstanding cylindrical edges of said walls and said strap when the free end of the latter is secured to said rest.

2. A pipe-connection-clip comprising a rest including two walls at right angles to the axis of the pipe to be clamped and each having a semi-circular recess at the upper edge, a semi-cylindrical clamping strap hinged to one side of the pipe-rest and provided at its free end with an ear and a wedge-hole therein, said rest having two ears with wedge-holes therein and adapted to receive the free end of said strap, the breadth of the clamping strap where it overlies the pipe being less than the distance between said two walls of the rest, said overlying part being spaced at substantially equal distances from said walls, whereby said pipe is pinched between the upstanding cylindrical edges of said walls and said strap when the free end of the latter is secured to said rest, and a wedge member adapted to secure said strap to said ears and draw said strap downwardly to clamp a pipe.

JOHAN FRIEDRICH KÖHNKE.

REFERENCES CITED

The following references are of record in the file of this patent:

UNITED STATES PATENTS

| Number | Name | Date |
| --- | --- | --- |
| 1,389,282 | Yingling | Aug. 30, 1921 |
| 1,706,147 | Davidson | Mar. 19, 1929 |
| 1,729,910 | Smallwood | Oct. 1, 1929 |
| 2,021,082 | North | Nov. 12, 1935 |

FOREIGN PATENTS

| Number | Country | Date |
| --- | --- | --- |
| 900,497 | France | 1945 |